United States Patent [19]

McCulloch et al.

[11] 4,326,122
[45] Apr. 20, 1982

[54] ELECTRIC HEATER FOR NUCLEAR FUEL ROD SIMULATORS

[75] Inventors: Reginald W. McCulloch, Knoxville; Chester S. Morgan, Jr., Oak Ridge; Ralph E. Dial, Concord, all of Tenn.

[73] Assignee: The United States of America as represented by the United States Department of Energy, Washington, D.C.

[21] Appl. No.: 168,977

[22] Filed: Jul. 14, 1980

[51] Int. Cl.³ .............................................. H05B 3/44
[52] U.S. Cl. ..................................... 219/544; 29/611; 219/553; 338/238; 338/302
[58] Field of Search ........................ 219/523, 544, 553; 338/238–242, 302; 29/611

[56] References Cited

U.S. PATENT DOCUMENTS

| | | | |
|---|---|---|---|
| 3,252,122 | 5/1966 | Baxter | 338/271 |
| 3,372,305 | 3/1968 | Mikolec | 361/266 |
| 3,813,771 | 6/1974 | Skogland | 29/611 X |
| 3,859,500 | 1/1975 | Matys | 219/553 |
| 3,859,501 | 1/1975 | Matys | 219/553 |
| 3,912,908 | 10/1975 | Clail et al. | 338/302 |
| 3,939,557 | 2/1976 | Rendle | 338/302 |
| 4,001,547 | 1/1977 | Boggs et al. | 29/611 |
| 4,112,410 | 9/1978 | Wrop et al. | 338/302 |
| 4,112,577 | 9/1978 | Mann | 29/611 |
| 4,120,086 | 10/1978 | Crandell | 29/611 |
| 4,263,577 | 4/1981 | Bauchert et al. | 29/611 |

Primary Examiner—Leon Gilden
Attorney, Agent, or Firm—Earl L. Larcher; Stephen D. Hamel; Richard G. Besha

[57] ABSTRACT

The present invention is directed to an electric cartridge-type heater for use as a simulator for a nuclear fuel pin in reactor studies. The heater comprises an elongated cylindrical housing containing a longitudinally extending helically wound heating element with the heating element radially inwardly separated from the housing. Crushed cold-pressed preforms of boron nitride electrically insulate the heating element from the housing while providing good thermal conductivity. Crushed cold-pressed preforms of magnesia or a magnesia-15 percent boron nitride mixture are disposed in the cavity of the helical heating element. The coefficient of thermal expansion of the magnesia or the magnesia-boron nitride mixture is higher than that of the boron nitride disposed about the heating element for urging the boron nitride radially outwardly against the housing during elevated temperatures to assure adequate thermal contact between the housing and the boron nitride.

6 Claims, 3 Drawing Figures

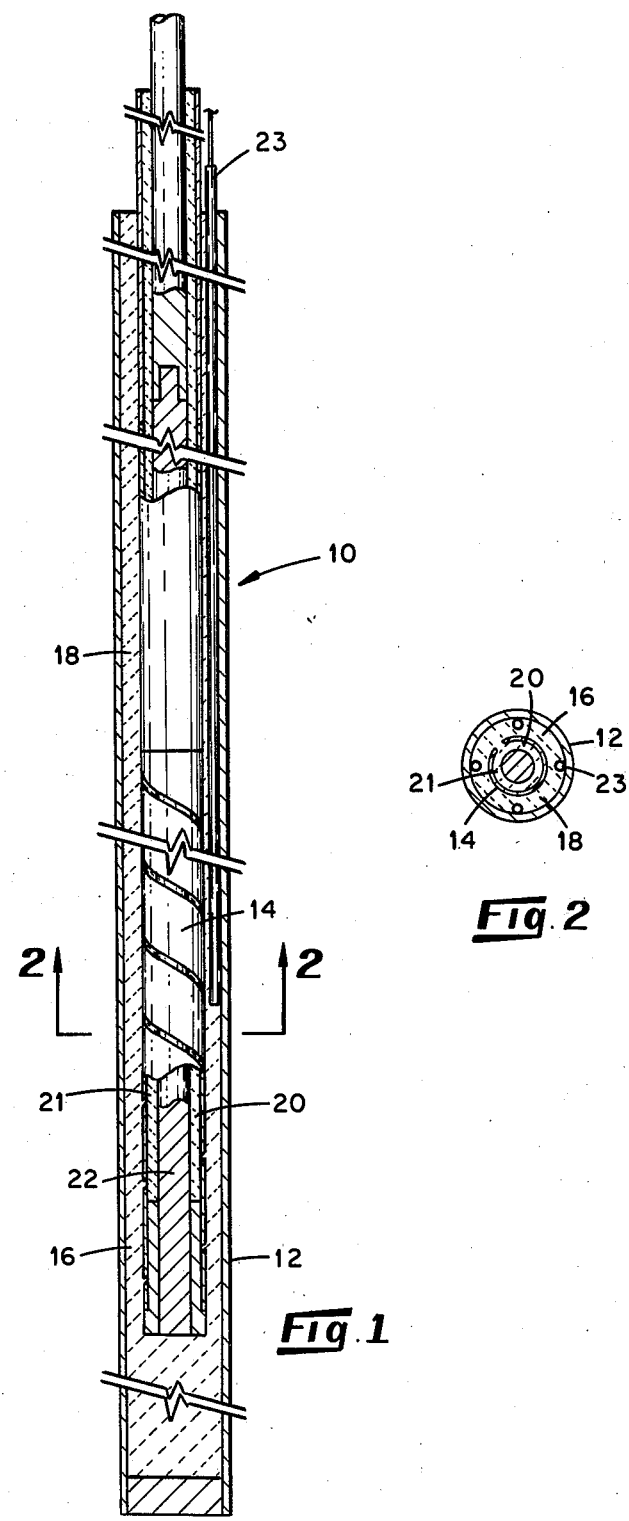

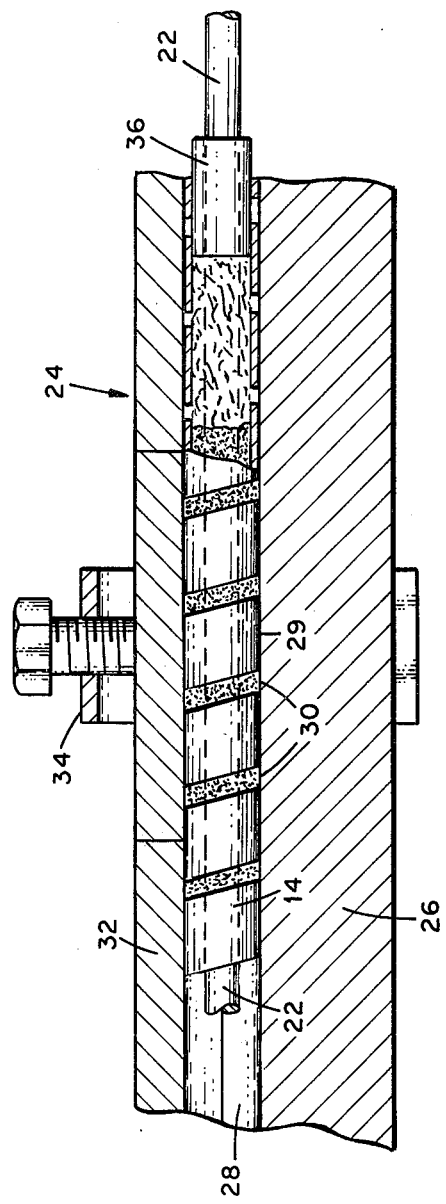

ELECTRIC HEATER FOR NUCLEAR FUEL ROD SIMULATORS

This invention was made as the result of a contract with the U.S. Department of Energy.

BACKGROUND OF THE INVENTION

The present invention relates generally to high temperature electric heaters for use as nuclear fuel rod simulators in testing nuclear reactors, and more particularly to the fabrication of an improved fuel rod simulator which closely resembles an actual nuclear fuel rod or pin.

The present invention is directed to an improved high temperature electric heater particularly useful as a nuclear fuel rod simulator in safety and thermal hydraulic studies in nuclear ractors. Nuclear fuel rod simulators of the type described herein use electrical energy to simulate the heating produced in a stack of nuclear fuel pellets and have been previously utilized in reactor studies. For example, one such nuclear fuel rod simulator is described in commonly assigned U.S. Pat. No. 4,106,186 issued to Chester S. Morgan, Jr. et al, Aug. 15, 1978 and entitled "Boron Nitride Insulating Material." Inasmuch as the nuclear fuel rod simulator of the present invention represents a modification of the fuel rod simulator described in the aforementioned patent, the teachings of this patent are incorporated herein by reference.

As described in the aforementioned patent, the high temperature fuel rod simulators each comprises a cartridge-type assembly in which a cylindrical metal housing is provided with a longitudinally and concentrically disposed heating element with this heating element being separated from the metal housing by boron nitride (BN). The boron nitride provides both electrical insulation and sufficient thermal conductivity to provide the simulator with a moderately high heat flux in the range of about 100 to 400 watts/cm$^2$. The electric heating element disposed within the metal housing is a helically wound ribbon of Nichrome V or Kanthal A-1 through which an electric current is passed. The cavity within the electric heating element formed by the helical winding is similarly filled with boron nitride insulating material.

Prior to the development in cartridge-type heaters as described in assignee's aforementioned patent, the annulus between the heating element and the shell, or housing, and the cavity in the heating element were filled with boron nitride powder. The tamping of this "loose" powder was attempted by compacting the powder with tools inserted into the annulus and the heating element cavity. Inasmuch as this powder composition required the use of tamping tools of dimensions closely approximating the dimensions of the annulus and the heating element cavity, considerable abrasion and displacement of metal from the heating element, tool, and the shell occurred which significantly reduced the voltage breakdown potential and electrical resistance of the heater and often led to heater malfunctions due to the presence of this displaced metal in the insulating material. Further, the tamping of the "loose" boron nitride powder resulted in initial density levels of 50 to 63% theoretical and thus required a great deal of swaging of the fuel rod simulator to provide the desired density of about 95% theoretical of the insulator. This often resulted in excessive deformation and failure of internal thermocouples, heating elements, and other heater components.

Efforts to provide insulators of increased density to decrease the amount of swaging required included the use of extruded and sintered cylinders of magnesia (MgO) in the heating element cavity. The use of these magnesia cylinders did not prove to be satisfactory since the transient profile uniformity requirements of ±5% in a 40° C./sec transient could not be attained because of the deleterious effects of variations in density (heat capacity) of the MgO. Additionally, hardness variations in the magnesia resulted in diameter variations in the heating element which in turn caused excessive heat flux variations.

Several other problems were also introduced by swaging, even if done in smaller amounts. For example, internally confined thermocouples were frequently sufficiently damaged so as to significantly decrease useful heater lifetime. Also, tolerances in the dimensions of the cartridge heater were increased by swaging so as to cause substantial variations from the dimensions desired.

Another disadvantage associated with the swaging of the assembled heaters is due to the orientation of the boron nitride particulates forming the insulator. It has been found that the orientation of the basal planes of the boron nitride particulates in the radial direction with respect to the longitudinal axis of the heater provides significantly greater thermal conductivity while maintaining desired electrical insulating properties than the orientation of the basal planes of the boron nitride particulates along the longitudinal axis of the heater. Swaging causes the basal planes of the boron nitride particulates to be oriented substantially along the longitudinal axis of the heater.

The fabrication technique utilized to fabricate cartridge-type heaters with boron nitride insulators as described in assignees' aforementioned patent overcomes many problems encountered in the fabrication of heaters previously used for nuclear fuel rod simulations. As pointed out in this patent, the annular region between the heating element and the housing and the cavity within the heating element are both provided with boron nitride insulation. The boron nitride powder was cold pressed into preforms having a length-to-diameter ratio of about 3:1. These preforms were then inserted into the cavity in the heating element and then in the annular region between the heating element and the housing. The preforms were preferably inserted into the cavity and the annulus one at a time and individually crushed by a tool of dimensions insufficient to damage the housing, or the heating element as previously encountered. By utilizing the cold-pressed preforms the boron nitride is at a considerably higher and more uniform density than previously provided by tamping loose powder and the thermal conductivity through the insulation is more uniform than achievable by the significantly deformed or swaged heaters as previously utilized. This allows for much less swaging of the heater to reach the desired levels of density and density uniformity.

While the fabrication techniques disclosed in assignees' aforementioned patent provided cartridge heaters with significantly improved operating characteristics over those previously obtainable, there were still several shortcomings which detracted from the overall desirable features of the heater. For example, even though the use of the crushable preforms significantly reduced the extent of swaging required, the swaging of the preforms with a diameter reduction of about 1 to 3% was found to be necessary in order to achieve the required final density and thermal contact between the boron nitride and the housing.

It was also found that without utilizing a swaging operation that the differences in the coefficient of thermal expansion between the boron nitride insulator in the annulus and the sheath or housing caused the housing to be radially displaced away from the boron nitride at elevated temperatures so as to significantly reduce the contact between the insulator and the housing and thereby substantially reduce the thermal conductivity through the insulator. Further, even with the slight extent of swaging utilized in the heater fabrication described in the aforementioned patent, the choice of the sheath material was necessarily limited to metals capable of undergoing the cold working encountered during the swaging operation. Therefore, materials normally used as nuclear fuel cladding such as zircaloy, "roughened" or ribbed stainless steel, or uniformly prestrained stainless steel which are virtually nonswagable, could not be used as the housing material for the heaters so that simulation of the actual nuclear fuel pin assemblies could not be as accurate as achievable with heaters using actual cladding material. Also, even with a relatively small degree of swaging such as utilized in the aforementioned patent, the thermo-couples disposed within the annulus between the heating element and the housing were prestrained to an extent so as to reduce their useful lifetime to one fifth that normally encountered with no prestrain.

SUMMARY OF THE INVENTION

It is the primary objective or aim of the present invention to provide an improved cartridge heater which is fabricated in such a manner as to negate the need for swaging while providing the desired thermal conductivity and insulating characteristics during high temperature operation of the heater. By practicing the present invention the heater may be provided with a housing formed of essentially nonswagable metals or alloys as commonly used as reactor fuel cladding so as to provide a heater exhibiting characteristics more closely corresponding to actual nuclear fuel pins than previously achievable. In a cartridge heater constructed in accordance with the present invention, particulates of the polycrystalline boron nitride disposed in the annulus between the helical heating element and the housing or sheath are preferentially oriented with the basal planes thereof being radially oriented with respect to the longitudinal axis of the heater so as to provide a higher thermal conductivity for a given density than would result from a random or longitudinal orientation of the particulates.

In the cartridge heater of the present invention a thermal insulating material is utilized in the central cavity or core of the heating element that has a volumetric coefficient of thermal expansion higher than that of the boron nitride in the annulus about the heating element. Thus, when the sheath of the cartridge heater which has a higher coefficient of thermal expansion than the insulator expands away from the boron nitride insulator, the centrally disposed insulating material in effect sufficiently expands to force the encompassing boron nitride in the annulus radially outwardly to maintain an adequate contacting relationship with the shell to assure a sufficient level of thermal conductivity between the shell and the boron nitride insulator.

A particulate magnesia (MgO) or a magnesia-boron nitride mixture provides a satisfactory material for forming the insulator within the cavity of the heating element since this material has a volumetric coefficient of thermal expansion sufficiently higher than that of boron nitride to effectively maintain the thermal contact between the shell and the boron nitride insulator. As in the case of the boron nitride in the annulus between the heating element and the sheath, the magnesia or magnesia-boron nitride mixture is first cold pressed into preforms and then individually inserted and crushed in situ within the heating element.

By utilizing the present fabrication technique, the fuel rod simulators do not require the swaging or cold-working step heretofore required. By obviating the use of this swaging step, the tolerances on the diameter roundness and straightness of the fuel rod simulators are readily maintained. Also, by eliminating the swaging operation the thermocouples within the heater have a considerably longer operational lifetime. Further, the fuel rod simulators can be fabricated at a cost substantially less than that previously required due to the cost of and rejections caused by the swaging operation.

Other and further objects of the invention will be obvious upon an understanding of the illustrative method and embodiment about to be described or will be indicated in the appended claims, and various advantages not referred to herein will occur to one skilled in the art upon employment of the invention in practice.

DESCRIPTION OF THE DRAWINGS

FIG. 1 is a vertical cross sectional view of a cartridge-type heater fabricated in accordance with the present invention, FIG. 2 is a cross-sectional view taken along lines 2-2 of FIG. 1 showing further details of the cartridge heater, and FIG. 3 is a somewhat schematic view of an encasement mechanism which is utilized about the helical heating element for filling the cavity therein with the crushable magnesia or magnesia-boron nitride preforms.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DESCRIPTION OF THE INVENTION

With reference to FIGS. 1 and 2 there is shown a cartridge-type electric heater 10 constructed in accordance with teachings of the present invention. The heater 10 is shown comprising a metallic shell or housing 12 formed of a cladding material similar to that used for nuclear fuel pins. Such cladding materials include zircaloy, stainless steel, and the like. Within the cylindrical shell 12 is disposed a helically wound heating element 14 formed of a suitable material such as Nichrome V or Kanthal A-1. The heating element 14 is concentrically oriented along the longitudinal axis of the shell 12 at a location radially inwardly spaced there-from. The annulus 16 defined between the helically wound heating element 14 and the shell 12 is filled with particulate boron nitride insulating material 18. The cavity within the heating element 14 as generally indicated by numeral 20 is filled with particulate magnesia or a magnesia-boron nitride mixture.

The cavity 20 may be provided with a longitudinally extending conductor 22 of nickel or the like for supplying the heating element 14 with the necessary operating current. As shown, the conductor 22 is radially inwardly spaced from the heating element 14 so to define an annular cavity 20. However, while the conductor 22 is shown disposed in the heating element 14 along the length thereof, it will appear clear that the heating element 14 can be electrically coupled at each end of the heater 10 as to eliminate the centrally disposed conductor 22.

In order to monitor and control the operation of the heater 10, axially extending clad thermocouples 23 (four shown in FIG. 2) may be disposed in the boron nitride particulates 18 in the annulus 16.

As described in the aforementioned patent the boron nitride particulates disposed in the annulus 16 are first cold pressed into preforms and then, if desired, individually inserted and crushed one at a time in the annulus 16. The annular boron nitride preforms 18 are fabricated with axial grooves on their outer surface which allow them to be positioned around the thermocouples 23. In the present invention the boron nitride particulates are the same as, and the formation of these particulates into preforms and the crushing of the preforms are preferably essentially identical to, that described in the aforementioned patent. However, in the instant invention a more uniform density of the crushed preforms is achieved by sequentially inserting the preforms into the annulus 16 from opposite ends of the housing 12 and crushing the individual preforms to build the insulator 18 in both directions from the longitudinal center of the housing 12.

Prior to the insertion of the annular boron nitride preforms in the annulus 16, the cavity 20 (annular or open) within the heating element 14 is provided with crushed magnesia or a magnesia-boron nitride mixture 21 with the boron nitride providing up to about 15 wt.% of this mixture. A greater concentration of boron nitride in this mixture does not provide for adequate thermal expansion of the insulator in the heating element 14 to overcome the aforementioned problems due to the differences in the coefficient of thermal expansion of the boron nitride insulator 18 in the annulus 16 and the shell 12. The magnesia or the magnesia-boron nitride mixture is fabricated into preforms by cold pressing the powders in a manner essentially similar to that used for the boron nitride preforms used in the annulus 16. The magnesia particulates used for the inner preforms have a particle size in the range of about 1 to 15 microns and a tap density in the range of about 0.85 to 1.1 gms/cm$^3$. The cold pressing of the magnesia or the magnesia-boron nitride powder mixture is achieved at a pressure in the range of about 15,000 to 45,000 psig at room temperature. These preforms may be of an annular configuration or a solid cylinder, depending on the form of the cavity 20, with the diameter of the preforms being such so as to readily fit into the central cavity 20 without damaging or displacing the individual coils of heating element 18.

As shown in FIG. 3, the preforms of magnesia or magnesia oxide are placed within the helical heating element 14 and crushed while the heating element 14 and the centrally disposed conductor 22 are encased in a support mechanism generally shown at 24. This mechanism 24 is shown comprising a base member 26 having a longitudinally extending concave cavity 28 of a radius corresponding to the outer diameter of the heating element 14. The cavity 28 is of a length corresponding to the longitudinal length of an individual coil of the heating element 14 plus any additional terminal lead-in (not shown). The top support sections 32 have a concave cavity of the same diameter of the base member 26 except that approximately 0.010 inch has been machined off their matching surface. This machining operation provides an interference fit of the support sections 32 with the base member 26 around the coil 12. The clamps 34 (shown as C-clamps but could be any suitable clamping mechanism) are torqued to 5-15 in-lb to tightly clamp the coil 12 in place within the cavity 20 thus formed. With the helical heating element disposed within this encasement mechanism, the coils of the heating element are locked in place about the entire circumference thereof so as to prevent radial or circumferential displacement of the heating element. While the heating element is confined in the encasement mechanism, individual preforms of the magnesia or magnesia-boron nitride mixture, such as generally shown at 36, are inserted into the center of the helical heating element 14 and then crushed with a suitable tamping tool (not shown) at a pressure loading of about 250 to 500 in-lb/in$^2$ to assure adequate uniform densification of the magnesia or magnesia-boron nitride preforms. The preforms, when crushed, move radially to fill the spaces or voids 30 formed between the heating element turns. The cavity 20 in the heating element 14 can be loaded with individual preforms from one end of the heating element 14 or from the opposite ends thereof with these preforms being individually crushed so as to fill the cavity 20 in the heating element 14 from either a central location towards the opposite ends thereof or from one end to the opposite end thereof.

The magnesia or magnesia-boron nitride preforms are at a preform density in the range of about 1.8 to 2.0 gms/cm prior to crushing and when crushed by the tamping tools within the heating element 14 are at a density in the range of about 70 to 90% theoretical density.

After completing the filling of the cavity 20 in the helical heating element 14, the latter is removed from the encasement device 24 and the conductor 22 in the cavity 20, if used, is electrically coupled to the heating element 14 by tungsten inert gas and/or electric capacitor discharge welding. The heating element is centrally positioned within the housing 12. Then, the annular boron nitride preforms are inserted in the annulus and individually crushed to fill the annulus with boron nitride particulates in the desired density range of about 80 to 90% of theoretical. A higher more uniform density of the boron nitride 18 in the annulus 16 as well as an improved contact of preforms and clad are achieved by the individual crushing of the preforms. These improvements are possible because of the increased restraint of the higher density preforms in the inner coil 14 as a result of the use of an encasement device and by introduction of the annular preforms from the center of the heating element 14 and their filling axially to the opposite ends. Thus, better uniformity, higher annular density and thermal conductivity are achieved by utilizing the encasement device 26 5 for the insertion and crushing of the preforms 36 in the coil 14.

The thermal expansion associated with the difference in the coefficiency of thermal expansion of the shell 12 and the boron nitride 18 in the annulus 16 causes a more rapid radial growth of the shell 12 than the boron nitride insulating material so as to decrease the contact area between the boron nitride and the internal surface of the shell 12. Thus, even though the value of thermal conductivity is a reasonable constant as a function of the boron nitride powder, it decreases with the increasing temperatures due to this difference in thermal expansion with the shell 12, so as to effectively reduce the thermal conductivity through the heater. However, by utilizing the magnesia or magnesia-boron nitride mixture 21 within the cavity 20 of the heating element 14, adequate contact is maintained between the shell 12 and the heating element 14 with the boron nitride in the annulus 16 through all temperature ranges of use due to the higher coefficient of thermal expansion of magnesia or magnesia-boron nitride mixture. Even though a lower thermal conductivity is achieved within the heating element cavity 20 by using the magnesia or magnesia-boron nitride mixture, this is still a desirable arrangement since high thermal conductivity through the center of the cavity is not needed and this arrangement increases the effective annular thermal conductivity of the heater because of the higher thermal expansion of the inner magnesia or magnesia-boron nitride mixture during high temperature operations.

What is claimed is:

1. An improved electric heater comprising an elongated hollow cylindrical housing, a hollow helically wound heating element disposed in said housing at a location radially inwardly spaced from the inner wall thereof and concentric with the longitudinal axis of the housing to define an annulus therebetween, boron nitride particulates filling said annulus with the basal planes of the boron nitride particulates being predominantly oriented in a radial direction with respect to said axis and with said boron nitride being at a density in the range of about 80 to 90% theoretical density, and a particulate mass comprising magnesia particulates with up to about 15 weight percent boron nitride filling the cavity defined within said hollow heating element with this fill being sufficiently tamped to provide a density of at least about 70% of theoretical density.

2. The electric heater claimed in claim 1, wherein said housing is formed of a material selected from the group consisting essentially of zircaloy and stainless steel.

3. A method of fabricating an electric heater comprising an elongated hollow cylindrical housing, a hollow helically wound heating element within said housing disposed at a location radially inwardly spaced from the inner wall of said housing to form an annulus therebetween, said annulus being filled with boron nitride particulates and the cavity within the hollow heating element being filled with magnesia particulates with up to about 15 weight percent boron nitride particulates, said method comprising the steps of individually inserting discrete preforms formed of cold-pressed magnesia with up to about 15 weight percent boron nitride into the cavity of the heating element and crushing the preforms one at a time in said cavity to provide a particulate mass radially filling said cavity with the mass of density in the range of about 70 to 90% of theoretical density, filling the cavity with the said crushed preforms for a desired longitudinal length thereof, and thereafter individually crushing cold-pressed preforms of boron nitride powder in said annulus to fill the annulus with boron nitride powder with the basal planes of the powder particulates being predominantly oriented in a radial direction.

4. The method of fabricating an electric heater as claimed in claim 3, including the step of circumferentially confining the helically wound heating element prior to and during the insertion and crushing of the preform magnesia particulates for maintaining the heating element at a predetermined diameter.

5. The method of fabricating an electric heater as claimed in claim 4 including the step of confining the heating element, maintaining the individual coils of the heating element at predetermined longitudinal spaced-apart locations.

6. The method of fabricating an electric heater as claimed in claim 4, wherein the insertion of the preforms into at least one of said cavity and said annulus is provided by inserting and crushing the preforms at opposite ends thereof for filling at least one of said cavity and said annulus from about the longitudinal center of the housing towards the opposite ends thereof.

* * * * *